United States Patent Office 3,359,850
Patented Dec. 26, 1967

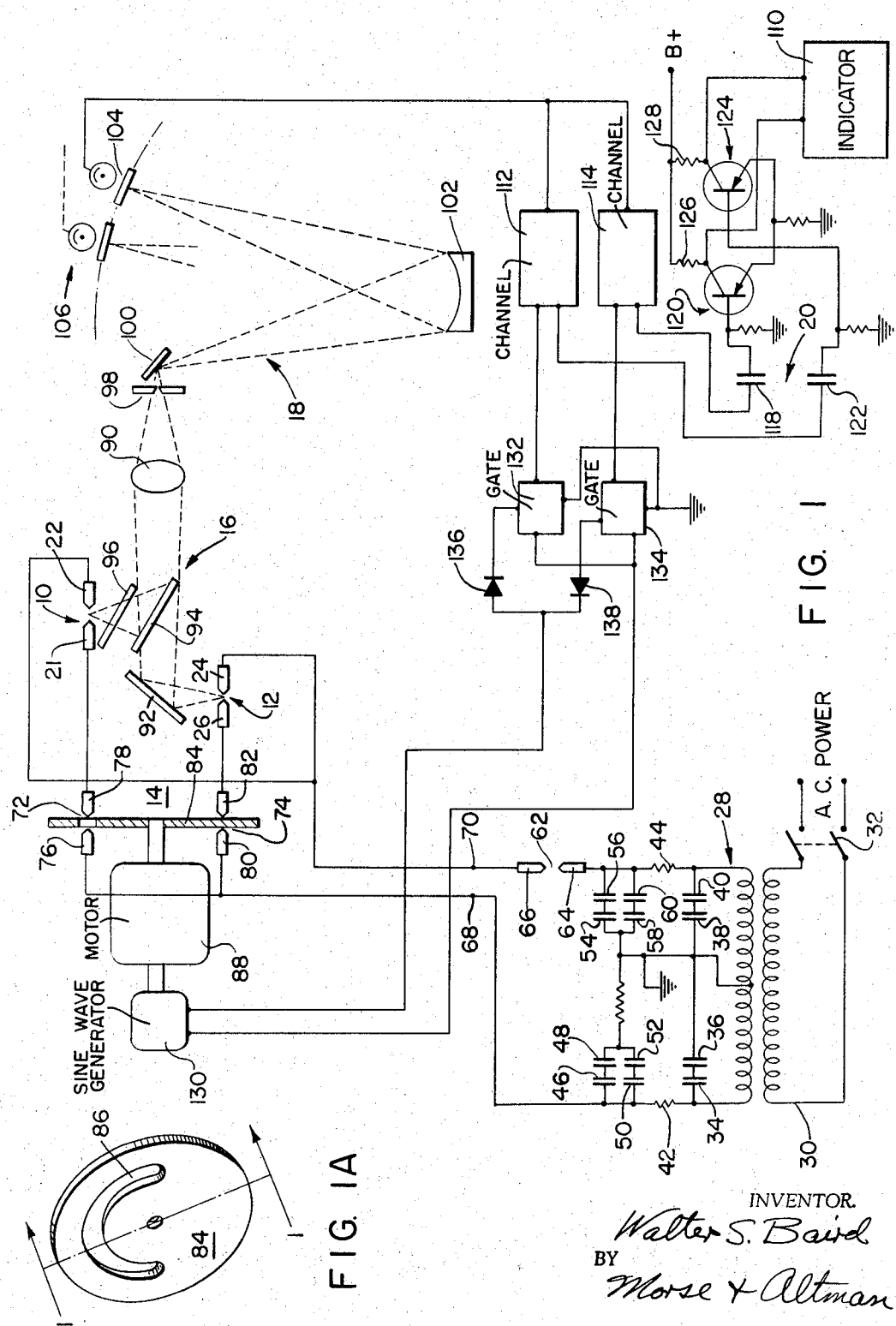

3,359,850
SPECTROSCOPIC APPARATUS
Walter S. Baird, Lexington, Mass., assignor to Baird-Atomic, Inc., Cambridge, Mass., a corporation of Massachusetts
Filed Jan. 27, 1964, Ser. No. 340,429
8 Claims. (Cl. 88—14)

ABSTRACT OF THE DISCLOSURE

A direct reading spectrometer is provided in which a pair of spectra are generated, one being an unknown specimen spectrum and the other being a reference sample spectrum. A chopper applies first one spectrum and then the other spectrum to pairs of detecting channels. Charges are built up in pairs of capacitors, the inputs to which are controlled by gates. The chopper and the gates are synchronized. The result is that each capacitor pair is characterized by a specimen charge and a reference charge that provides an extremely accurate spectroscopic indication.

---

The present invention is a continuation in part of co-pending application Ser. No. 189,794, now U.S. Patent No. 3,171,882, filed Apr. 24, 1962 in the name of Walter S. Baird for Spectroscopic Apparatus.

The present invention relates to spectrum analysis and, more particularly, to spectrometers of so-called "direct reading" type which automatically indicate the chemical composition of a specimen by determining the intensity distribution of radiation of characteristic wavelengths emitted by the specimen under excitation.

By way of example, a typical direct reading spectrometer comprises an entrance slit that transmits radiation from an electrically excited specimen, a diffraction grating that forms a spectrum from radiation so transmitted, and a plurality of exit slits that transmit radiation of preselected wavelengths to corresponding photocells in order to determine the differing intensities of the radiation at these wavelengths. In a typical prior spectrometer readout system the output of the photocells are directed to capacitors which integrate charges within a predetermined time to indicate the intensities of the preselected wavelengths. Problems have been encountered in the calibration of such a readout system. The present invention contemplates a novel spectrometer readout system characterized by the reduced delicacy of adjustment and increased high precision.

The primary object of the present invention is to incorporate double-beam optical arrangement in a direct reading spectrometer for comparing the intensities of corresponding spectrum lines of an unknown specimen and a standard specimen in order to improve accuracy of resulting indications of the chemical composition of the unknown specimen. A more specific object of the present invention is to provide a direct reading spectrometer with unknown specimen radiation and standard specimen radiation from a pair of parallel emission gaps that are energized respectively by a high-voltage source through a pair of parallel auxiliary gaps in such a way that out-of-phase mechanical chopping in the auxiliary gaps causes alternate electrical discharge in the spark gaps, the resulting emission being represented by integrated charge in separate capacitors.

Thus, in the system of the present invention, a sample having a composition that is approximately known is compared with a standard having a composition that is precisely known, the comparison being made in such a way that, by using the method of differences, unprecedented precision is possible.

Other objects of the present invention will in part be obvious and will in part appear hereinafter.

The invention accordingly comprises the apparatus possessing the features, properties, and relations of components that are exemplified in the following detailed disclosure, the scope of which will be indicated in the appended claims. For a fuller understanding of the nature and objects of the present invention, reference should be had to the following detailed description, taken in connection with the accompanying drawings wherein:

FIG. 1 is a diagram, partly in mechanical schematic and partly in electrical schematic, of a preferred system embodying of the present invention; and FIG. 1A is a perspective view of a mechanical component of the system of FIG. 1.

Generally, the illustrated embodiment of the present invention comprises: a pair of electrically excited gaps 10, 12 for an unknown specimen and a standard specimen; a chopper system 14 for alternately supplying power to gaps 10 and 12; a double-beam optical system 16 for transmitting radiation alternately generated by gaps 10 and 12; a direct reading spectrometer system 18 for dispersing radiation received for double optical system 16 into a pair of spectra and for generating alternate sets of signals representing corresponding sets of spectral wavelengths; and a capacitor readout system 20 for comparing pairs of charges generated as a function of the intensities of pairs of corresponding wavelengths of the unknown and the standard.

Unknown specimen gap 10 and the standard specimen gap 12, which are defined by pairs of carbon electrodes 21, 22 and 24, 26, are energized by chopper system 14 in the following manner. The input power circuit for chopper system 14, generally designated 28, is an alternating current spark source including a transformer 30, the primary of which is energized by a relatively low line voltage 32, for example, 220 volts AC, and the secondary of which develops a relatively high open circuit voltage, for example, 25,000 volts AC. Connected across the secondary of transformer 30 are a bank of capacitors 34, 36, 38 and 40, which in combination with a pair of resistors 42, 44 form a frequency filter network for protection of the transformer. Any high frequency currents flowing back from the oscillatory portion of the circuit pass safely through this network in such a way as to avoid overloading the transformer. Resistors 42, 44, which, for example, are 5000 ohms each, also act as secondary current limiting elements so that in the event of oscillatory circuit failure, the transformer will not suffer direct short circuit. Connected between the output extremities of resistors 42, 44 are banks 46, 48, 50, 52 and 54, 56, 58, 60 of capacitors, across which in parallel are specimen and standard gaps 10 and 12. In series with gaps 10 and 12 is an auxiliary air gap 62, which is defined by a pair of electrodes 64, 66. The operation is such that incoming current generates a charge on the capacitor banks until the resulting potential across the networks is large enough to ionize air gap 62. The concomitant high voltage is capable of generating a sequence of very high frequency oscillations in specimen and standard gaps 10, 12. Thereafter these high frequency oscillations soon are damped out by the reactance of the air gaps, capacitor network and wiring. A continuous blast of air, however, is directed through air gap 62 in order to replace the ionized air with fresh, unionized air so that a continuing sequence of spark discharge oscillations is ensured. These oscillations occur at very high frequencies, of the order of 2 megacycles with a very wide bandwidth, which are not dependent on the 60 cycle power alternating current power input to transformer 30.

It will be observed that between the output terminals 68, 70 of power source 28 is a pair of switching gaps 72, 74, gap 72 being defined by a pair of refractory electrodes 76, 78 and gap 74 being defined by a pair of refractory electrodes 76, 78 and gap 74 being defined by a pair of refractory electrodes 80, 82. Electrodes 76, 78 and 80, 82 are spaced apart sufficiently to permit the interposition of a refractory chopping disk 84. As shown in FIG. 1A, chopper disk 84 is provided with an arcuate slot 86 extending throughout a hemi-circular arc. Chopper disk 84 is rotated, at a speed for example of 600 revolutions per minute, by a synchronuous motor drive 88 in order to clear and block chopper gaps 72, 74. Preferably, electrodes 76, 78 and 80, 82 are composed of such an electrically conducting refractory material as tungsten and disk 84 is composed of such an insulating refractory material as quartz or pyrex glass. As disk 84 rotates, spark discharges are generated alternately in unknown and standard gaps 10 and 12.

Beam splitting optical system 16 includes an objective lens 90 which establishes an optical path for radiation from gaps 10 and 12 toward spectrometer system 18. Radiation from gap 12 is directed into the optical path by an oblique mirror 92. Radiation from gap 10 is directed into the optical path by a beam splitting mirror 94. Beam splitting mirror 94 transmits an appreciable portion of the radiation reflected by oblique mirror 92 and a corrector plate 96 is interposed in the path from gap 10 for intensity compensation. In effect, gaps 10, 12 are at the same conjugate point with respect to objective 90. At the opposed conjugate point is an entrance slit 98 of spectrometer system 18 now to be described.

In conventional fashion, spectrometer system 18 includes entrance slit 98, an oblique mirror 100 for orienting radiation incoming through entrance slit 98, a curved diffraction grating 102 for dispersing radiation from entrance slit 98 into a pair of alternate spectra and plurality of exit slits 104 for transmitting resulting spectrum lines. Each slit transmits a pair of alternating spectrum lines of like wavelength and generated in unknown gap 10 and standard gap 12. A plurality of photocells, one of which is shown at 106, are adapted to receive the plurality of pairs of spectrum lines of the foregoing type. A direct reading spectrometer of the foregoing type is described in detail in U.S. Patent No. 2,837,959, issued June 10, 1958 in the name of Jason L. Saunderson et al. for Automatic Means for Aligning Spectroscopic Components and U.S. Patent No. 2,937,561, issued May 24, 1960 in the name of Jason L. Saunderson et al. for Spectroscopic Apparatus.

A pair of alternate signals generated in one of photocells 106 are applied to capacitor-readout system 20 respectively through a pair of channels, one being designated 112 for the unknown and the other being designated 114 for the standard. The alternate signals are applied respectively to a pair of alternate capacitors 118, 122 through a pair of gates 132, 134. Gates 132, 134 are controlled via a pair of rectifiers 136, 138 by a sine wave generator 130 that is in synchronism with motor drive 88. This arrangement enables differential application of the unknown and standard signals of channels 112, 114 to pair of capacitors 118, 122. The charges on capacitors 118, 122 are compared in a differential amplifier circuit, one stage being shown as including a transistor 120 and other stage being shown as including a transistor 124. The bases of these transistors are connected respectively to the output of capacitors 118, 122. The collectors of transistors 120, 124 are connected to B+ through a pair of resistors 126, 128. The collector of transistor 120 and the collector of transistor 124 are connected via output leads to a suitable indicator 110. These output leads provide a differential analog voltage which corresponds to the difference in intensities of the signal pair. As indicated above, this difference is a very accurate indication of the concentration of the particular element in this sample characterized by the wavelength selected for consideration. The integrating circuits, indicators and related circuitry of each channel are disclosed in greater detail in U.S. Patent No. 2,577,814 issued Dec. 11, 1951, to Jason L. Saunderson for Photoelectric Eye Instrument for Direct Spectrochemical Analysis by the Internal Standard Method; U.S. Patent No. 2,577,815, issued on the same date to the same inventor for an invention of the same name; U.S. Patent No. 2,647,236, issued July 28, 1953 to Jason L. Saunderson for Electrical Circuit for Measuring the Ratio of Two Potentials; and U.S. Patent No. 2,807,677, issued on Sept. 24, 1957, to Victor J. Caldecourt for Stable Direct Current Amplifier.

In operation, a standard disk of known composition is placed in gap 12 and a specimen disk of unknown composition is placed in gap 10. Under the excitation of input power circuit 28, a high voltage is applied across switching gaps 72, 74. As chopper disk 84 rotates this high voltage is applied alternately across standard gap 10 and specimen gap 12. The refractory conducting composition of electrodes 76, 78 and 80, 82 and the refractory insulating composition of disk 84 minimizes mechanical failure. The alternate resulting spectral distributions in spectrometer system 18 are such as to enable selection of alternate analogous spectrum lines for application to photocells 106, one photocell for each pair of alternate spectrum lines. Synchronization of the alternate optical emission and the alternate capacitive charge is effected by gates 132, 134 and associated circuitry under the control of motor drive 88 and sine wave generator 130. In typical operation, the spark time is 35.6 seconds, the spark carries 10 amperes and there are eight breaks in the spark per half cycle of operation of disk 84.

The present invention thus provides a highly precise readout for a spectrometer capable of comparing an unknown sample, the composition of which is approximately known, with a standard, the composition of which is precisely known, by using the method of differences. Since certain changes may be made in the above disclosed subject matter without departing from the scope of the invention herein involved, it is intended that all matter contained in the above description and shown in the accompanying drawings shall be interpreted in an illustrative and not in a limiting sense.

What is claimed is:

1. Spectroscopic apparatus comprising a pair of sources for exciting a pair of chemical samples to emit a pair of characteristic radiation distributions, an entrance slit for transmitting said pair of characteristic radiation distributions, a diffraction grating for dispersing said characteristic radiation distributions into a pair of spectra, said pair of spectra having a plurality selected pairs of lines of substantially like wavelength, a plurality of exit slits positioned to transmit said plurality of selected pairs of lines of said spectra, a plurality of photodetectors for receiving said plurality of selected pairs of lines from said exit slits, a plurality of pairs of readout channels, one each of said plurality of pairs of readout channels being operatively connected to one each of said plurality of photodetectors, one line of a particular selected pair causing a signal in one channel of a particular selected pair and the other line of said particular selected pair causing a signal in the other channel of said particular selected pair, a plurality of pairs of readout capacitors, one each of said plurality of pairs of readout capacitors being operatively connected in one each of said plurality of channels, chopping means for alternately applying said one line of said pair of spectra and said other line of said pair of spectra to said one each of said plurality of photodetectors, gate means for alternately applying said signal in one channel of said particular selected pair to one capacitor of a particular selected pair and applying said signal in said other channel of said particular selected pair to the other capacitor of said particular selected pair, and synchronizing means operatively connecting said chopping means and said gate means.

2. The spectroscopic apparatus of claim 1 wherein said pair of sources include pairs of electrodes, and a high voltage power source across said pairs of electrodes, said pairs of electrodes being in parallel.

3. The spectroscopic apparatus of claim 2 wherein a pair of auxiliary gaps are in series with said pair of sources, respectively, each of said pairs of auxiliary gaps being defined by a pair of terminals, said chopper rotating in a path intersecting said two auxiliary gaps.

4. The spectroscopic apparatus of claim 3 wherein said chopper is composed of a refractory insulator and said pair of terminals are composed of a refractory conductor.

5. The spectroscopic apparatus of claim 4 wherein an objective establishes a path having a pair of conjugate foci, said entrance slit being at one of said conjugate foci, a beam splitter for effectively separating the other of said conjugate foci into two locations, one of said sources being at one of said locations, the other of said sources being at the other of said locations.

6. The spectroscopic apparatus of claim 5 wherein a differential amplifier compares the charges on at least one of said pairs of capacitors.

7. The spectroscopic apparatus of claim 1 wherein an objective establishes a path having a pair of conjugate foci, said entrance slit being at one of said conjugate foci, a beam splitter for effectively separating the other of said conjugate foci into two locations, one of said sources being at one of said locations, the other of said sources being at the other of said locations.

8. The spectroscopic apparatus of claim 1 wherein a differential amplifier compares the charges on at least one of said pairs of capacitors.

References Cited

UNITED STATES PATENTS 3,171,882    3/1965    Baird _____ 88—14

JEWELL H. PEDERSEN, *Primary Examiner.*

F. L. EVANS, *Assistant Examiner.*